United States Patent [19]

Schlosser

[11] Patent Number: 4,523,574
[45] Date of Patent: Jun. 18, 1985

[54] SUPPORT STRUCTURE FOR GRILL COVER

[75] Inventor: Erich J. Schlosser, Lindenhurst, Ill.

[73] Assignee: Weber-Stephen Products Co., Palatine, Ill.

[21] Appl. No.: 522,109

[22] Filed: Aug. 11, 1983

[51] Int. Cl.³ .............................................. A47J 37/00
[52] U.S. Cl. ................................ 126/25 R; 126/41 R; 220/379; 220/85 CH; 16/110.5
[58] Field of Search ................. 126/39 B, 41 R, 25 R, 126/25 C; 220/379, 85 CH; 16/110 R, 110.5; 248/311.2

[56] References Cited

U.S. PATENT DOCUMENTS

| 1,672,819 | 6/1928 | Madden | 220/379 X |
| 2,403,134 | 7/1946 | Stephenson | 126/25 R |
| 3,714,937 | 2/1973 | Linstead | 126/25 R |
| 4,281,633 | 8/1981 | Wackerman | 126/25 C |

FOREIGN PATENT DOCUMENTS 1404342 8/1964 France .......................... 220/85 CH Primary Examiner—Randall L. Green
Attorney, Agent, or Firm—Robert E. Wagner; Ralph R. Rath

[57] ABSTRACT

An outdoor cooking kettle consisting of a generally hemispherical lower portion having a cooking surface therein and a generally hemispherical cover enclosing the cooking surface with the lower portion having diametrically-opposed handles extending outwardly from the surface thereof. The cooking kettle incorporates an arcuate member that is secured to the diametrically-opposed handles and defines a generally arcuate upwardly-opening slot receiving the cover and storing the cover in a generally upright position.

5 Claims, 4 Drawing Figures

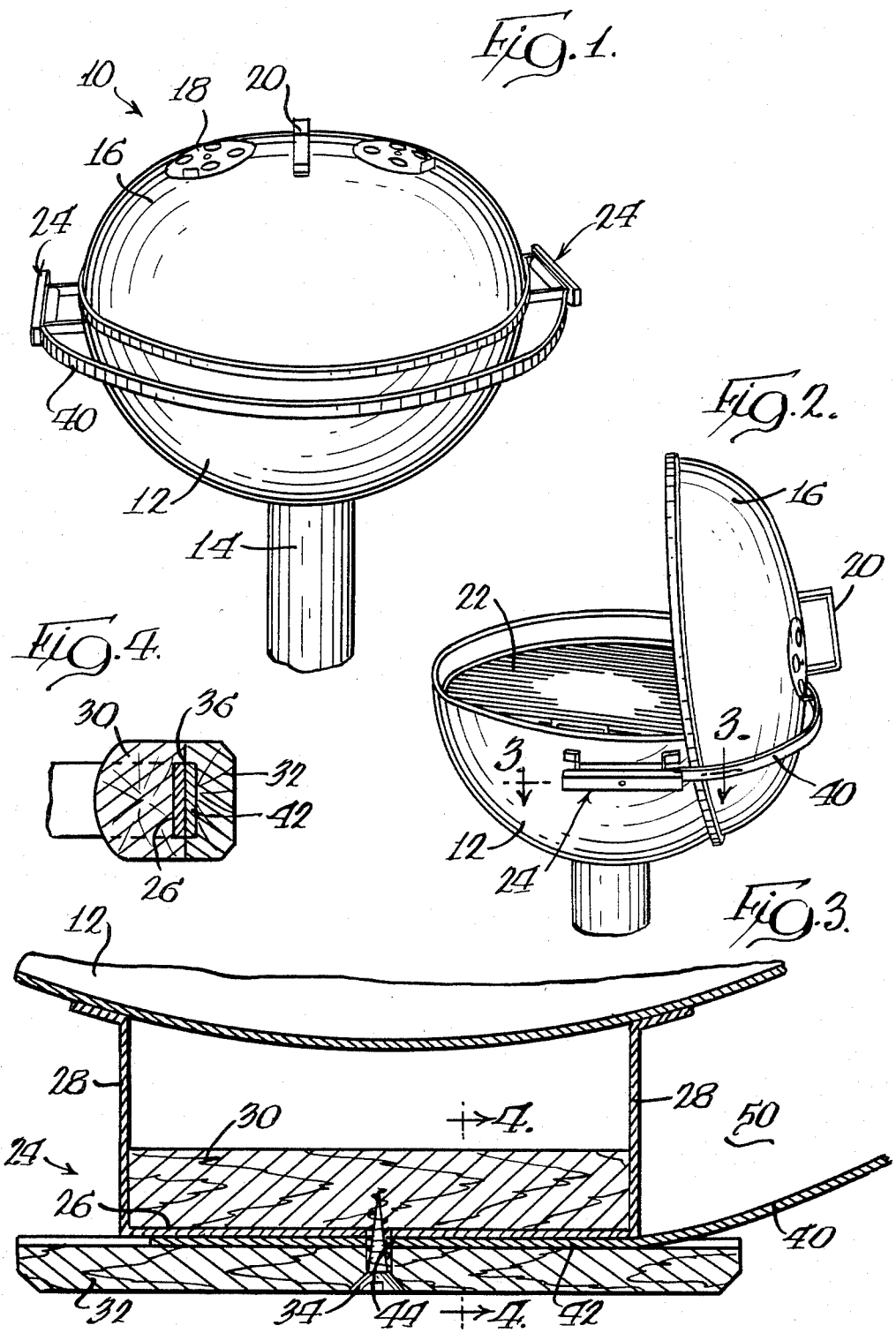

SUPPORT STRUCTURE FOR GRILL COVER

DESCRIPTION

1. Technical Field

The present invention relates generally to outdoor cooking devices and, more specifically, to a novel structure for supporting a removable cover for such outdoor cooking devices.

2. Background Prior Art

A cooking device for outdoor cooking has been in existence for a number of years. One of the most popular types of cooking devices that is presently being marketed by the Assignee of the present invention is commonly referred to as a barbecue kettle. This cooking device consists of a generally hemispherical bowl that has a circular open top with a cooking surface located slightly below the upper edge or rim of the bowl. The bowl is supported on some type of a structure consisting of either a tripod leg arrangement or a center post arrangement and has a cover for enclosing the cooking surface. The bowl and cover both have vent openings so that the cooking can be done while the cover is closed.

The cooking device presently being marketed by the Assignee of the present invention also incorporates a hook that is generally C-shaped and is attached to an inner surface of the cover adjacent the periphery thereof so that the cover can be suspended on the upper rim of the bowl.

While the present structure has received a remarkable degree of commercial success, constant efforts are being made to upgrade and improve certain qualities of the cooking device.

Many times it is desirable to be able to have the cover partially shield the cooking surface, such as during outdoor cooking in extremely windy conditions. Various mechanisms have been proposed for providing such a support, and one example is disclosed in Canadian Pat. No. 950,785. This patent proposes having the cover supported by a hinge structure on the bowl so that the cover can be pivoted and still be retained in a desired position which partially shields the cooking surface. While such structure allows the cover to be pivoted to a generally upright position, the manner of supporting the cover is extremely bulky and adds to the overall cost of the unit. Furthermore, utilizing hinge structures such as disclosed in the Canadian patent creates additional problems which cannot be readily coped with in this industry. Most present-day cooking devices generally consist of a metal base that is covered with porcelain to increase the life of the unit. With a unit structure consisting of a circular member extending from the cover, inherent wear will cause the porcelain to be removed if it is covered with porcelain. If it is not covered with porcelain and is a separate element that is attached after the cooking device has been completed, there will be a tendency for rust to accumulate on the surface thereof.

SUMMARY OF THE INVENTION

According to the present invention, an extremely simplified cover support has been developed with can easily be sold as an accessory and attached to existing units or sold as part of a new unit which can easily be assembled by the purchaser.

According to the present invention, the cover support structure consists of a single arcuate member that extends between diametrically-opposed handles that extend from the lower portion of a cooking vessel. The arcuate member cooperates with the outer surface of the lower portion of the cooking device to define a generally arcuate slot for receiving the cover and supporting the cover in a generally upright position so that the cover may act as a partial shield for the cooking surface.

BRIEF DESCRIPTION OF SEVERAL VIEWS OF DRAWINGS

FIG. 1 is a fragmentary perspective view of an outdoor cooking device incorporating the present invention;

FIG. 2 is a view generally similar to FIG. 1 showing the cover supported in an upright position;

FIG. 3 is a cross-sectional view as viewed along line 3—3 of FIG. 2; and,

FIG. 4 is a cross-sectional view as viewed along line 4—4 of FIG. 3.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

FIG. 1 of the drawings illustrates a partial perspective view of a barbecue grill or cooking device, generally designated by reference numeral 10. The cooking device consists of a generally hemispherical lower portion or bowl 12 that is supported on a center post 14 and the illustrated unit is specifically designed for using propane gas as the fuel, although the unit could also be of the type that utilizes charcoal briquettes as a fuel. The cooking device also has a cover 16 which is again generally hemispherical and has adjustable vents 18, as well as a handle 20 to be used for removing the cover.

The lower hemispherical portion or bowl 12 has a grill 22 which defines a cooking surface located slightly below the upper rim of the bowl. The commercial unit sold by the Assignee of the present application also incorporates a pair of diametrically-opposed handles 24 that can be used for moving the entire unit. Each handle (FIG. 3) consists of a generally U-shaped metallic member that has a bight portion 26 and a pair of generally parallel legs 28, the outer ends of which are secured to the outer surface of bowl 12 by suitable means, such as spot welding. Generally, the bight portion 26 and legs 28 are formed from a metal material which conducts a substantial amount of heat. Therefore, each handle 24 has first and second non-metallic portions 30 and 32 which cover opposite sides of the bight portion 26 and are retained on bight portion by a screw 34. The handle portions 30 and 32 are preferably formed from a non-metallic and non-heat-conducting material, such as wood or plastic, and are recessed at 36 to completely enclose the bight portion 26 and prevent any direct exposure of the metallic bight portion to the hands of the user. The structure so far described is a commercially-available unit that is presently being marketed by the Assignee of the present invention.

According to the present invention, a single additional inexpensive element is designed to be incorporated into the existing cooking device 10 without any modification thereof and defines a cradle structure for maintaining the cover in a generally upright condition, as illustrated in FIG. 2. As illustrated in FIGS. 1 and 2, the cradle structure is produced with a generally arcuate member or bar 40 that has generally flat end portions 42. The end portions 42 have a length that generally corresponds with the length of the bight portion 26 and each end portion has an opening 44. The arcuate member 40 is generally equally spaced from the outer surface of the lower portion 12 and defines a generally arcuate slot 50 that extends between adjacent legs 28 of each of the handles 24.

Normally the cover is in the position illustrated in FIG. 1 during storage and indirect cooking. In instances where it is desirable to have the cooking surface 22 exposed to the atmosphere, the cover is moved to the position illustrated in FIG. 2 where it extends generally upright and provides a partial shield for the cooking surface 22 when doing open cooking under windy conditions. In the upright stored position illustrated in FIG. 2, the cover is generally wedged between the arcuate member 40 and the outer surface of the lower portion 12 of the cooking device.

As can be appreciated from the above description, the present invention provides an extremely inexpensive, simplified mechanism that can be sold as an accessory and attached to existing cooking device without any modification thereof. Of course, modifications come to mind without departing from the spirit of the invention. For example, for new units being manufactured, the end portions 42 of the arcuate member 40 could be an integral part of the handle portions 24 and these end portions could define the bight portion 26 for the handles 24. Under such circumstances, the arcuate member could be formed with an inwardly-directed leg that defines the outer leg 28 and an additional leg 28 could be welded adjacent the inner end of the end portion 42.

I claim:

1. In combination with an outdoor cooking kettle having a generally hemispherical lower portion and a removable cover with said lower portion having diametrically-opposed handles extending from an outer surface thereof and each handle having a gripping portion spaced from said outer surface, the improvement of a cover support on said lower portion, said cover support comprising an arcuate member connected to said handles and extending between said gripping portions and spaced from said outer surface to define a slot for receiving said cover, the weight of said cover producing a wedging action with said hemispherical lower portion and said cover support so that said cover is retained in an upright position.

2. The combination as defined in claim 1, in which each gripping portion includes a center core and nonmetallic first and second handle segments on opposite sides of said center core and in which said arcuate member has opposite ends received between respective first and second handle segments.

3. The combination as defined in claim 2, further including common fastener means connecting said handle portions and said arcuate member to respective center cores.

4. In combination with an outdoor cooking kettle consisting of a generally hemispherical lower portion having a cooking surface therein and a generally hemispherical cover for enclosing said cooking surface, said lower portion having diametrically-opposed handles with each handle including a bight portion and a pair of spaced legs having free ends secured to an outer surface of said lower portion, the improvement of a cover support on said lower portion for supporting said cover in a generally upright position, said cover support including an arcuate member extending between and connected to respective bight portions and being substantially equally spaced from said outer surface between said bight portions to define a generally arcuate upwardly-opening slot for receiving said cover, the weight of said cover producing a wedging action with said hemispherical lower portion and said cover support so that said cover is retained in an upright position and acts as a partial shield for said cooking surface.

5. The combination as defined in claim 4, further including first and second handle portions on opposite sides of respective bight portions and common fastener means interconnecting each of said handle portions, arcuate member and bight portion.

* * * * *